June 20, 1950     G. T. LAMPTON     2,511,858
METHOD OF MAKING PROPELLER BLADES
Filed April 23, 1943     3 Sheets-Sheet 1
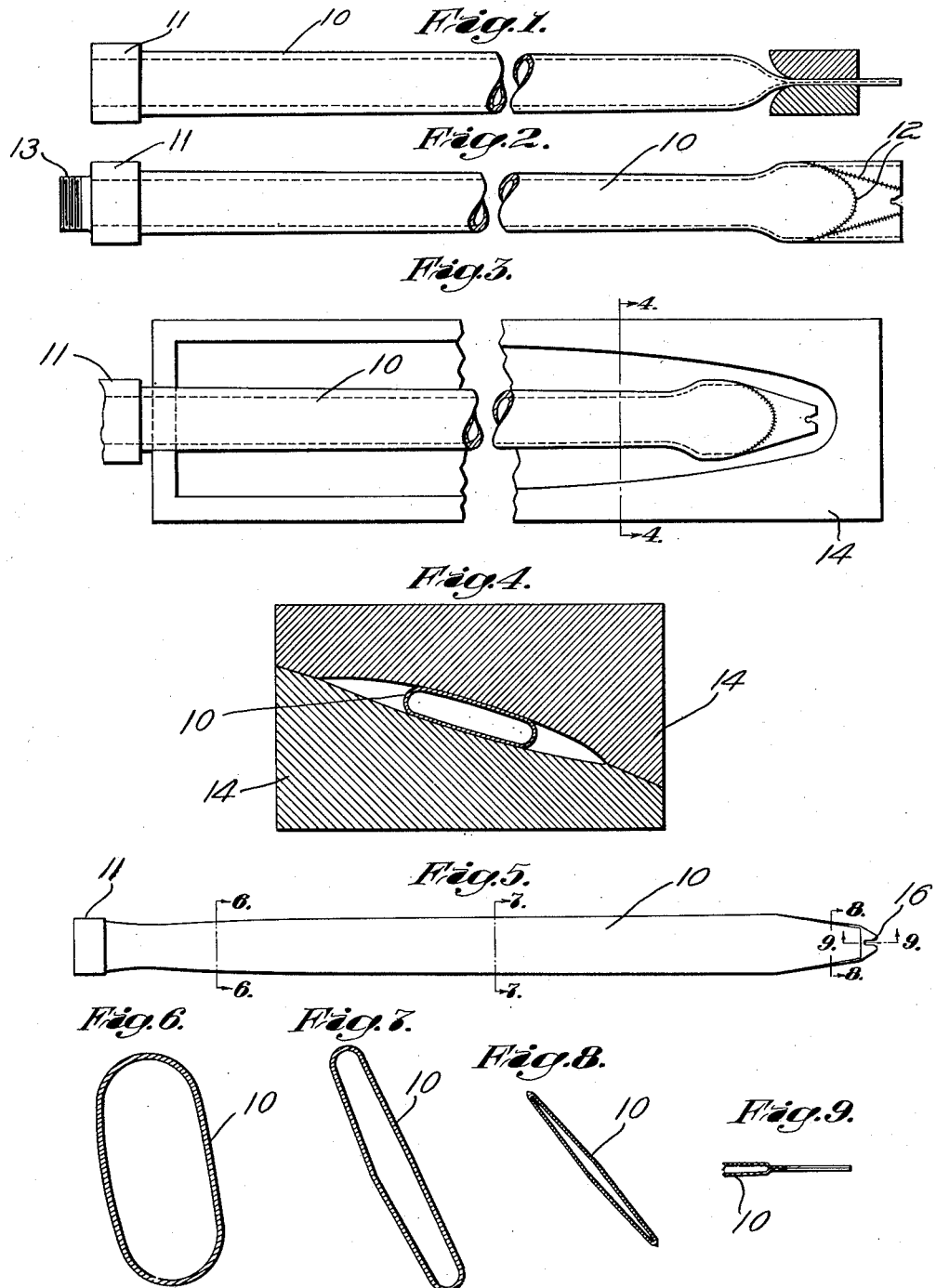
INVENTOR
Glen T. Lampton
BY Charles L. Shelton
Attorneys June 20, 1950 G. T. LAMPTON 2,511,858
METHOD OF MAKING PROPELLER BLADES
Filed April 23, 1943 3 Sheets-Sheet 3
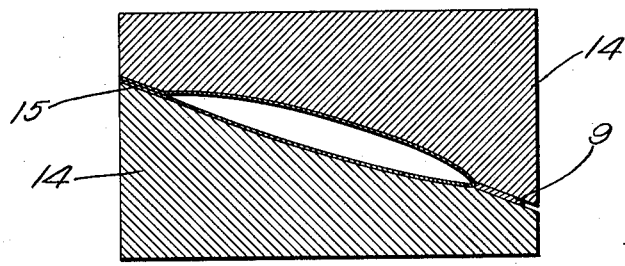
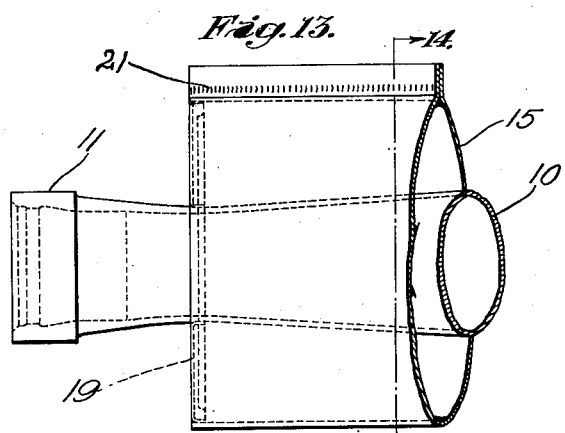
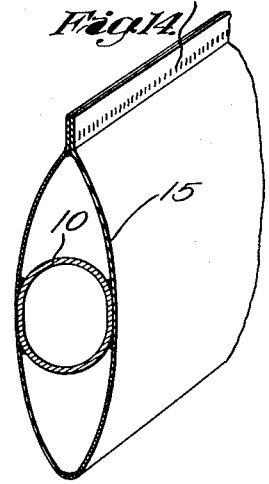
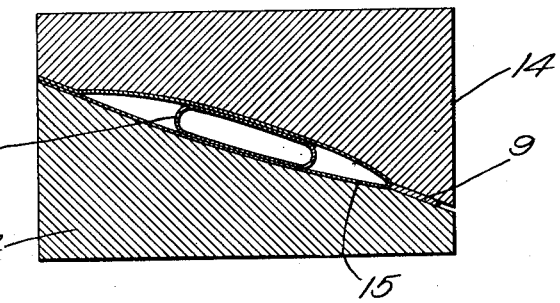
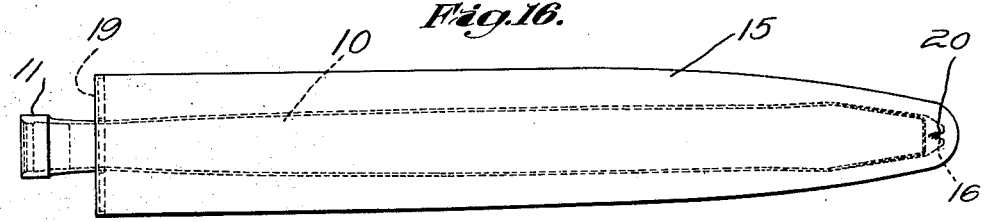
INVENTOR
Glen T. Lampton
BY Charles L. Shelton
Attorney Patented June 20, 1950

2,511,858

UNITED STATES PATENT OFFICE 2,511,858

METHOD OF MAKING PROPELLER BLADES

Glen T. Lampton, West Hartford, Conn., assignor to United Aircraft Corporation, East Hartford, Conn., a corporation of Delaware Application April 23, 1943, Serial No. 484,254

14 Claims. (Cl. 29—156.8)

This invention relates to a process of making an improved form of hollow all-metal blade for airplane propellers.

A primary object of the invention is to provide a simple, efficient and expeditious process for producing an aeronautical propeller blade the steps of which include, first individually preforming the two principal members which form the blade, and thereafter brazing or otherwise uniting these two members permanently together in their assembled position; preferably these members are united throughout their adjacent surfaces, and the outer member, after assembling and uniting, may be conformed to a predetermined airfoil shape by any preferred means.

Another important object of the invention is to provide an improved method of preforming an outer or airfoil member for an airplane propeller blade, and for making a central tubular stress sustaining member for use with said airfoil member, the two members being assembled after being individually preformed to substantially their final forms, the preforming of the two members and their shaping after assembling being effected preferably by means of the same forming die.

It is also an object of the invention to permanently unite the inner or tubular supporting member and the outer or airfoil member by brazing or sweating their opposite adjacent surfaces together while said surfaces are being held in intimate contact.

With the above and other objects and advantages in view the invention includes the steps in the process of manufacturing a hollow all-metal aeronautical propeller blade set forth in the following specification and illustrated in the accompanying drawings which illustrate what is now considered to be the preferred process of carrying out the invention.

In the accompanying drawings, annexed hereto and forming a part of this specification, I have shown the various steps in the preferred process of making a particular form of hollow all-metal propeller blade, but it will be understood that the invention can be otherwise carried out and the drawings are not to be construed as defining or limiting the scope of the process; the claims appended to this specification being relied upon for that purpose.

In the drawings:

Fig. 1 is a longitudinal view of a machined blank for the inner or tubular member forming one of the principal members of the blade, the tube at one end being flattened between suitable forming dies.

Fig. 2 is a view of the tubular member shown in Fig. 1 after the flattened tip portion has been seam welded at its tip end and a threaded nipple added to its shank end, the view being taken at 90° from that shown in Fig. 1.

Fig. 3 is a view of the tubular member after having its tip end flattened and seam welded, and positioned within one-half of a two part forming die used in the present process, the upper half of the die being omitted to more clearly show the tubular member in place.

Fig. 4 is a transverse sectional view of the complete forming die with the tubular member shown in section therein, the view being taken with the die closed and substantially on the plane of line 4—4 of Fig. 3.

Fig. 5 is a longitudinal view of the tubular member after being elongated and conformed throughout its length substantially to its final shape within the forming dies as shown in Figs. 3 and 4, and prior to its being inserted within the outer or airfoil member.

Fig. 6 is a transverse sectional view on an enlarged scale of the tubular member taken approximately on the plane of line 6—6 of Fig. 5.

Fig. 7 is a transverse sectional view taken on the plane of line 7—7 of Fig. 5 enlarged similarly to Fig. 6.

Fig. 8 is a transverse sectional view taken on the plane of line 8—8 of Fig. 5 also somewhat enlarged.

Fig. 9 is a fragmentary longitudinal sectional view on an enlarged scale taken on the plane of line 9—9 of Fig. 5 at the tip end of the tubular member.

Fig. 12 is a transverse sectional view of the outer member in position within the forming dies for its preliminary forming operation after being centrally and longitudinally folded.

Fig. 13 is a fragmentary longitudinal view showing the shank end of the tubular and outer members in relative position for the final and permanent uniting operation.

Fig. 14 is a sectional view taken on an oblique transverse plane through line 14—14 of Fig. 13 and showing the joints between the airfoil and tubular members, and the welded or other seam along the trailing edge of the outer member prior to the final edge trimming operation.

Fig. 15 is a transverse sectional view of the assembled blade member shown in Fig. 14 within the complete forming die, and Fig. 16 is a longitudinal view of the completed blade made in accordance with the present invention.

Figure 11:
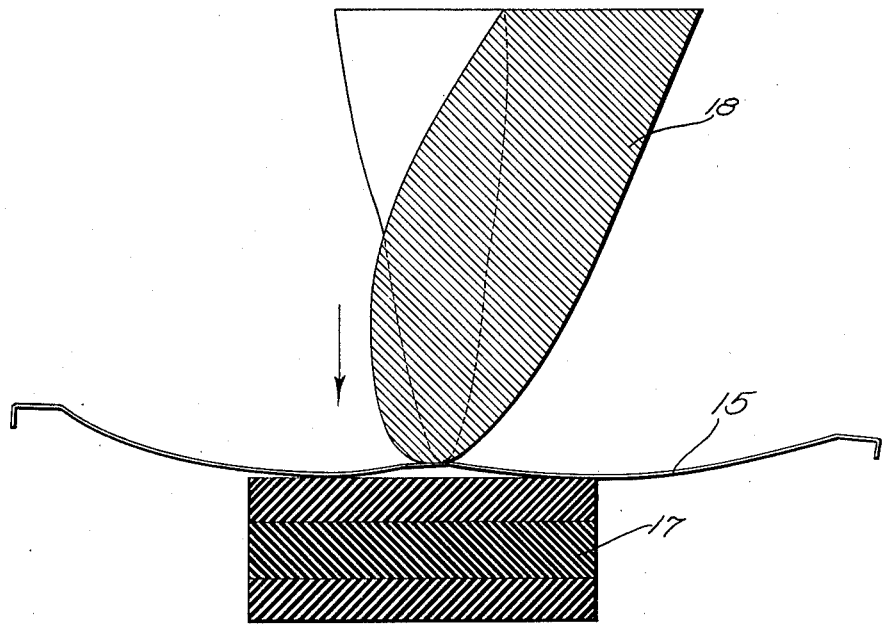
Fig. 11 is an end view of the outer member shown in Fig. 10 in position for being centrally and longitudinally folded, the member being shown in relation to the platen and ram of a suitable press.

In the above-mentioned drawings there has been shown but one complete blade made according to the present process of forming a form of hollow all-metal propeller blade which is now deemed preferable. It is to be understood, however, that changes and modifications may be made within the scope of the appended claims without departing from the spirit of the invention.

Briefly, and in it preferred aspect, the process comprising the present invention may include the following principal steps: First, machining and forming the inner or tubular member; second, shaping and centrally folding an outer or airfoil member; third, uniting the peripheral edges of the folded outer member; fourth, conforming the outer member substantially to aerodynamic form; fifth, assembling the tubular member within the shell or airfoil member; sixth, uniting the tubular and shell members permanently together; and seventh, finishing the blade to predetermined outline and airfoil sections.

The method of making the inner or tubular stress sustaining member of the blade first will be described.

A cylindrical tube 10 having a bore of uniform diameter is first carefully machined so that its wall will be progressively thinner toward one end. A collar 11 then may be shrunk or integrally formed on the heavier walled end of the tube 10 to form the shank portion of the finished blade and to provide attaching means for the blade to its hub. The completely machined tube 10 with its wall uniformly thinned toward one end is then drawn out longitudinally by a suitable swaging or other operation and flattened at its outer or thinner end by any apropriate means such as a press.

Thereafter this thinner or tip end has its flattened walls welded together preferably by electric resistance, spot or seam welding 12 as indicated in Fig. 2. The flattening of this end extends far enough back from its tip to permit this end of the tubular member 10 to enter the tip portion of the outer or airfoil member 15 presently to be described and to provide a centering means to aid in the assembly operation.

With the thinner end of the tubular member 10 completely closed by this welded seam 12 and preferably with a threaded nipple 13 provided at its shank or heavier walled end the tube is placed within a two part die 14 as indicated in Fig. 4. This die 14 when closed conforms substantially the entire length of the active portion of the tube 10 to a progressively flatter form toward its thinner end so that it will fit closely within the outer or airfoil member 15 presently to be more fully described.

During this forming operation of the tubular member 10, which may take place at a sufficiently high temperature to facilitate the flattening operation and while the member is within the forming die 14, a gas under pressure may be admitted to the interior of the tube 10 in order to maintain the tube fully extended and to prevent wrinkles or irregularities being formed within its surface. This gas may be, and preferably is, inert such as nitrogen and may be admitted through the threaded nipple 13 by any suitable means and at any predetermined pressure.

The tubular member 10 after being flattened by means of the forming die shown in Fig. 4 may take on substantially the plan-form shown in Fig. 5 in which the welded seam 12 still forms a pressure tight closure at the tip end of the blade. Extending a short distance axially beyond the blade outline are portions of the flattened walls of the tube within which is cut a wedge shaped notch or recess 16. This recess 16 is disposed in direct alignment with the principal axis of the tubular member 10 and serves as a locating means for the tip end of the tubular member when being positioned within the airfoil or shell member 15. The tubular member 10 forms the principal stress sustaining member of the blade and is made sufficiently strong and rigid to sustain the centrifugal bending and torsional stresses to which the blade when in use may be subjected.

The process of forming the outer or shell member 15 will now be described.

Figure 10:
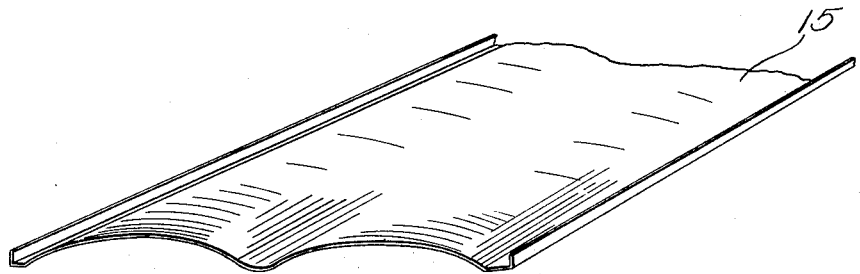
Fig. 10 is a perspective view of an intermediate portion of the outer or airfoil member of the blade partially formed and prior to being centrally folded, the surfaces shown in the figure forming the outside surfaces of this outer or airfoil member.

The shell member 15 comprises initially a thin flat sheet of metal first preliminarily formed between suitable conforming dies (not shown) to form the opposite sides or faces of the airfoil section opened out approximately 180°. This partly formed member 15, a portion of which is shown in Fig. 10, may then have its outline cut to a predetermined contour by any appropriate cutting means (not shown). The sheet thus partially formed and with its edges shaped to a predetermined periphery is then folded centrally and longitudinally upon itself to superimpose the pressure and camber surfaces (which are those shown in Fig. 10) directly opposite each other. This central longitudinal bending operation may be performed by means of a press having a compressible platen such as a thick body of rubber 17. The plunger 18 of the press may have its work engaging surface shaped as shown to accommodate the opposite surfaces of the outer member 15 after being doubled upon themselves. The fold thus formed extends centrally of the sheet along the edge of the shank and intermediate portions of the blade and in the finished blade forms a portion of the leading edge of the blade. The entire periphery of the blade except along this folded portion after this bending operation has its edges welded or otherwise integrally united electrically just beyond the finished edges of the blade as indicated at 21 in Fig. 14.

With the outer member 15 thus preliminarily formed and folded, and with its peripheral edges welded by the seam weld 21 as above described there is formed an enclosure, pressure tight except at its open shank end. Within this open end of the outer member 15 a bulkhead 19 may be temporarily inserted and secured in pressure tight relation therein, there being a suitable opening therein for the attachment of pressure applying means. The outer member 15 at this step in the process is only roughly formed in outline and the seam welding 21 at its periphery is so positioned that it will be outside the final outline or contour of the blade. With this member 15 so formed and with the edges along its opposite sides seam welded together the member 15 is inserted within the space between the halves of the dies 14 shown in Fig. 4. By means of this die the member 15 is conformed substantially to its final airfoil form. During this conforming operation within the dies 14, spacing means 9 are inserted along one of the longitudinal edges of the die 14 at which the front or leading edge of the blade is disposed. This spacing means 9 may comprise a metal strip having twice the thickness of the material of which the member 15 is made. On the opposite edge, the lateral extensions of the folded and shaped sheet 15 beyond the final outlines of the blade, form the means to properly space the dies. Closing of the die halves 14 with the admission of pressure to the interior of the shell member 15 conforms this member 15 closely to the outline of the dies, slightly spaced apart as indicated above. As in the process of conforming the tubular member 10 the shell 15 may be heated to a suitable working temperature during the forming operation.

With the outer member conformed to substantially its final form, the edges previously seam welded at 21 may be permanently united, preferably by copper welding their peripheral edges. As this process is well known, a detailed description is not thought to be necessary. It will suffice to state that copper within the member 15 heated in a reducing atmosphere to a temperature above its melting point is allowed to flow between the walls of the outer member just within the seam weld 21 so that upon cooling a solid copper joint or weld will be formed inside this member 15 throughout its periphery. This joint or weld takes the form of a fillet adjacent and within the periphery of the blade where the edges are united.

With the outer member 15 so formed by dies 14 the temporary bulkhead 19 at the shank end is removed and the tubular or inner member 10 inserted within this open end of the outer member. To center this inner member 10 relative to the outer member 15 so that the tubular member 10 may extend exactly centrally or axially therethrough, the shank end of the outer member 15 may have another bulkhead 19 inserted therein closely fitting around the shank end of the tubular member 10.

At the opposite or tip end of the blade a rivet 20 (see Fig. 16) is provided extending transversely through the opposite surfaces of the outer member 15. The surfaces of the outer member adjacent the rivet 20 are somewhat separated and the tip end of the tubular member 10, as indicated above, is made with a notched extension preferably formed integrally with the tip end of the tubular member. With the tubular inner member 10 inserted within the outer member and with the walls of notch 16 of this extension fitting closely about the center portion of the rivet 20 the shank portion of the tubular member 10 may be welded to the bulkhead 19 preferably made in two or more parts and these bulkhead members may also be welded or otherwise united with the outer member 15.

To permanently unite the tubular member 10 to the outer member 15 while retained in central position therein as described above, the assembled members preferably are dipped into a tank of melted solder or other material having a lower melting point than the copper or other brazing material used in permanently uniting the peripheral edges of the outer member 15. Small openings may be provided in the outer member adjacent the blade tip by means of which the melted solder may enter the space between the tubular and outer members. This material, after filling, may be drained slowly from this interior leaving the solder to form a firm joint between the contacting surfaces of these members 10 and 15 and serving to retain these members permanently together. During this operation the surfaces of member 15 may be compressed resiliently against the surface of the tubular member, and, if desired pressure may be admitted within the tubular member 10.

With the two members 10 and 15 permanently united as above described the outer member 15 may be conformed to any predetermined airfoil shape. The periphery of this outer member may be trimmed in a manner to cut away all of the seam welding, and the nipple 13 may be removed from the shank end of the tubular member 10.

It is to be understood that the invention is not limited to the specific steps in the process herein illustrated and described, but may be carried out in other ways without departure from its spirit as defined by the following claims.

I claim:

1. In the process of making a hollow propeller blade, the steps of forming a tube, flattening one end portion of said tube, forming locating means in the end of the flattened portion, inserting said tube into a sheet metal envelope of airfoil shape open at one end and having means defining a predetermined position adjacent the other end, and positioning said tube in said envelope by placing said locating means at said predetermined position with respect to said envelope.

2. In the method of forming a hollow metal propeller blade, the steps of forming a tube, flattening one end of said tube to form a portion of the tip of the blade, welding the flattened tip portion to form an airtight joint, shaping the tube in a die while simultaneously maintaining gas under pressure in said tube, providing the tip end of the flattened portion of said tube with locating means, inserting said tube in an elongated airfoil shaped envelope closed at one end and open at the other and having locating means adjacent said closed end, and utilizing said locating means to position the flattened end of said tube with respect to the closed end of said envelope.

3. The process of die-forming a hollow aeronautical propeller blade comprising, preforming an inner tubular member to predetermined areas, less that the whole, of the blade forming portion of blade forming dies, with the dies in closeed position, separately preforming an outer tubular airfoil member of sheet material to the entire blade forming area of said dies with the dies separated by twice the thickness of said sheet material, telescoping said members and superimposing the portions of the tubular member and the airfoil member preformed to the same areas of the dies, and uniting said preformed members while so superimposed.

4. In the process of making a hollow propeller blade, the steps of forming a tube, forming a notch in one end of said tube, inserting said tube, notched end first, through the open end of a tubular sheet metal envelope of airfoil shape closed at one end, inserting a pin transversely through the closed end of said envelope and locating the notched end of said tube with respect to the closed end of said envelope by longitudinally moving said tube with respect to said envelope until said notch straddles said pin.

5. In the process of making a hollow propeller blade, the steps of forming a tube, flattening one end portion of said tube, forming a notch in said flattened portion, inserting said tube, flattened end first, through the open end of a tubular sheet metal envelope of airfoil shape closed at one end and having locating means adjacent said end, and utilizing said notch to position the flattened end of said tube in a predetermined position with respect to the locating means adjacent the closed end of said envelope.

6. In the method of forming a hollow metal propeller blade, the steps of forming a tube, flattening one end of said tube to form a portion of the tip of the blade, welding the flattened tip portion to form an air tight joint, shaping the tube in a die while simultaneously maintaining gas under pressure in said tube, forming a notch in the flattened end of the tube, inserting said tube in an elongated airfoil shaped envelope closed at one end and having locating means adjacent said end and utilizing said notch to position the flattened end of said tube with respect to the locating means adjacent the closed end of said envelope.

7. In the process of die-forming a propeller blade, steps of, shaping a tube in a die to a cross-sectional shape less than the cross-section of said die while maintaining gas under pressure in said tube, shaping an elongated shell in the same die to airfoil shape and to dimensions in the blade thickness direction greater than said tube by substantially twice the thickness of the shell material, while maintaining the interior of said shell under pressure, and then permanently assembling said formed shell and tube in telescoped relation with the shell on the outside and corresponding die-formed areas superimposed.

8. The method of forming a propeller blade in a single die by a die-forming process which comprises, forming from sheet material, by means of said die, a hollow, blade-forming, airfoil shaped shell having predetermined blade chord and thickness dimensions, die-forming a tube in the same die to chord dimensions smaller than, and thickness dimensions smaller by substantially twice the sheet material thickness than, corresponding shell dimensions, and then securing said tube to, and inside said shell with the tube and shell parts formed by the same portions of said die superimposed.

9. In the method of forming a hollow metal propeller blade, the steps of flattening one end of a tube to close said end and form a portion of the tip of the blade, shaping the tube in a die while maintaining gas under pressure in said tube, forming a notch in the flattened end of the tube, shaping an elongated shell, having one closed end, in the same die to airfoil shape and to dimensions in the blade thickness direction greater than said tube by substantially twice the thickness of the shell material, while maintaining the interior of said shell under pressure, providing said shell with locating means adjacent the closed end thereof, inserting said tube into said elongated shell, superimposing corresponding die-formed areas of said shell and said tube, and utilizing said notch and locating means to position the flattened end of said tube with respect to the closed end of said shell, and then permanently uniting said formed shell and tube in telescoped relation with the shell on the outside and corresponding die-formed areas superimposed.

10. In the method of forming a hollow metal propeller blade, the steps of flattening one end of a tube to close said end and form a portion of the tip of the blade, shaping the tube in a die while maintaining gas under pressure in said tube, forming a notch in the flattened end of the tube, shaping an elongated shell, having one closed end, in the same die to airfoil shape and to dimensions in the blade thickness direction greater than said tube by substantially twice the thickness of the shell material, while maintaining the interior of said shell under pressure, providing said shell with position defining means adjacent said closed end inserting said tube into said elongated shell with corresponding die-formed areas of the shell and tube superimposed, and utilizing said notch and position defining means to position the flattened end of said tube with respect to the closed end of said shell.

11. The process of forming a hollow aeronautical propeller blade comprising, conforming the exterior surface of an inner tubular member to predetermined areas, extending less than the whole of the chordwise span, of a preselected blade-form, separately conforming an outer tubular member of sheet material to the entire chordwise span of said blade form including corresponding predetermined areas to give the outer surface of said outer member a propeller blade form, and the interior surface of said outer member a form corresponding to the exterior surface of said conformed tubular member, and to give said outer member an interior dimension in the blade thickness direction substantially the same as the corresponding exterior dimension of said inner tubular member, assembling said members with the portions of said members conformed to said corresponding predetermined areas superimposed, and uniting said members while so assembled.

12. The process of making a hollow metal aeronautical propeller blade comprising conforming the exterior surface of an inner tubular member to predetermined areas, extending less than the whole of the chordwise span, of the sides of a preselected propeller blade-form, separately conforming an outer tubular member of sheet material to the entire chordwise span of said blade form, including corresponding predetermined areas, to give the outer surface of said outer member an airfoil form and the portion of the interior surface of said outer member conformed to said predetermined area a form corresponding to the corresponding portion of the exterior surface of said conformed tubular member and an interior dimension in blade thickness direction substantially the same as the corresponding exterior dimensions of said inner tubular member, assembling said members with the surface portions conformed to said predetermined areas superimposed, and uniting said members while so assembled by solidifying on said superimposed surfaces, metal different from the metal of said members.

13. The process of making a hollow aeronautical propeller blade, comprising folding a sheet of metal of substantially uniform thickness centrally and longitudinally after having longitudinal depressions formed therein conforming to the camber and pressure surfaces of said blade, welding together the opposite edges thereof along a predetermined outline to form a gas retaining enclosure, conforming the exterior surface of an inner tubular member to predetermined areas, extending less than the whole of the chordwise span, of the sides of a preselected blade form, separately conforming an outer tubular member of sheet material to the entire chordwise span of said blade form, including corresponding predetermined areas of the sides of the preselected blade form to give the outer surface of said outer member an airfoil form and the interior surface at the sides of the outer member a form corresponding to the exterior surface at the sides of said conformed inner tubular member, and to give said outer member interior dimensions in the blade thickness direction substantially the same as the corresponding exterior dimensions of said inner tubular member, assembling said members with the side portions of said members conformed to said predetermined areas superimposed and uniting said members while so assembled.

14. In the method of forming a propeller blade, the steps of folding a sheet of metal upon itself to form an airfoil shaped envelope, welding one end and one side of said folded sheet to form a tubular member closed at one end, forming a tube for assembly with said shell with materially smaller peripheral dimensions than the periphery of corresponding transverse sections of said shell, conforming the exterior surfaces of the sides of said tube to predetermined areas, extending less than the whole of the chordwise span, of a preselected blade shape, separably conforming a shell of sheet material to the entire chordwise span of said blade shape to give the outer surface of said shell an airfoil form and the interior surface of the sides of said shell a shape corresponding to the exterior surface of the sides of said conformed tube with said interior surfaces spaced apart substantially the same distance as the corresponding exterior surface of the sides of said tube, assembing said tube and shell in telescoped relation with the shell on the outside and said corresponding surfaces superimposed, solidifying on said surfaces molten metal, different from the metal of said tube and shell, to unite the tube and shell along said corresponding surfaces.

GLEN T. LAMPTON.

REFERENCES CITED

The following references are of record in the file of this patent:

UNITED STATES PATENTS

| Number | Name | Date |
|---|---|---|
| 412,278 | Lee | Oct. 8, 1889 |
| 526,033 | Griswold | Sept. 18, 1894 |
| 814,804 | Rateau | Mar. 13, 1906 |
| 845,304 | Kinnear | Feb. 26, 1907 |
| 895,412 | Badger | Aug. 11, 1908 |
| 1,042,946 | Mittinger | Oct. 29, 1912 |
| 1,346,508 | Olhovsky | July 13, 1920 |
| 1,565,374 | Kramer | Dec. 15, 1925 |
| 1,920,830 | Wylie | Aug. 1, 1933 |
| 1,996,850 | Bendix | Apr. 9, 1935 |
| 2,050,142 | White | Aug. 4, 1936 |
| 2,060,901 | Smith | Nov. 17, 1936 |
| 2,101,149 | Martin | Dec. 7, 1937 |
| 2,108,209 | Reilly | Feb. 15, 1938 |
| 2,231,888 | Couch | Feb. 18, 1941 |
| 2,262,163 | Brauchler | Nov. 11, 1941 |
| 2,280,337 | McKee | Apr. 21, 1942 |
| 2,357,628 | Boerger | Sept. 5, 1944 |
| 2,366,164 | Weick | Jan. 2, 1945 |

FOREIGN PATENTS

| Number | Country | Date |
|---|---|---|
| 221,906 | Great Britain | Sept. 25, 1924 |
| 226,301 | Great Britain | Dec. 24, 1924 |
| 359,349 | Great Britain | Oct. 22, 1931 |
| 417,139 | Great Britain | Sept. 28, 1934 |
| 560,706 | France | Jan. 5, 1923 |
| 705,834 | France | June 12, 1931 |
| 770,908 | France | Sept. 24, 1934 |
| 812,018 | France | Apr. 28, 1937 |